United States Patent [19]

McAfee

[11] Patent Number: 5,544,958
[45] Date of Patent: Aug. 13, 1996

[54] ELEVATED CABINET APPARATUS FOR CAT OWNER

[76] Inventor: Lynley A. McAfee, 7 George St., Cotati, Calif. 94931

[21] Appl. No.: 319,273

[22] Filed: Oct. 6, 1994

[51] Int. Cl.$^6$ .................................................. A47B 83/00
[52] U.S. Cl. ..................... 312/237; 312/245; 312/248; 312/329; 312/138.1
[58] Field of Search ............................ 312/90, 237, 245, 312/248, 329

[56] References Cited

U.S. PATENT DOCUMENTS

| | | | |
|---|---|---|---|
| 363,372 | 5/1887 | Dollens | 312/248 X |
| 447,661 | 3/1891 | Burk | 312/237 |
| 470,378 | 3/1892 | Hamblin | 312/237 X |
| 1,463,511 | 7/1923 | Lane | 312/248 |
| 1,690,404 | 11/1928 | Dieckmann | 312/237 X |
| 1,861,802 | 6/1932 | Kelly | 312/237 |
| 2,521,572 | 9/1950 | Eckel et al. | 312/245 X |
| 3,338,648 | 8/1967 | Bannister | 312/237 X |
| 3,347,187 | 10/1967 | Khoury | 312/245 X |

*Primary Examiner*—Peter M. Cuomo
*Assistant Examiner*—Rodney B. White
*Attorney, Agent, or Firm*—Larry D. Johnson

[57] ABSTRACT

A storage cabinet is secured to the wall by at least one bracket, and has a top surface carrying a carpeted shelf for support of a cat box. The cat box shelf preferably has a hinged front wall or door for cat box removal, a fixed side and back wall, and one open side for cat access. An associated climbing tree has a base supporting a plurality of joined vertical poles wrapped with sisal rope, the poles supporting at least one climbing platform, with the poles secured to the wall by at least one bracket. The apparatus may include a cabinet support stand having a pair of sides on opposite sides of a toilet fixture, the support stand having at least one shelf between the sides and above the toilet fixture.

3 Claims, 4 Drawing Sheets

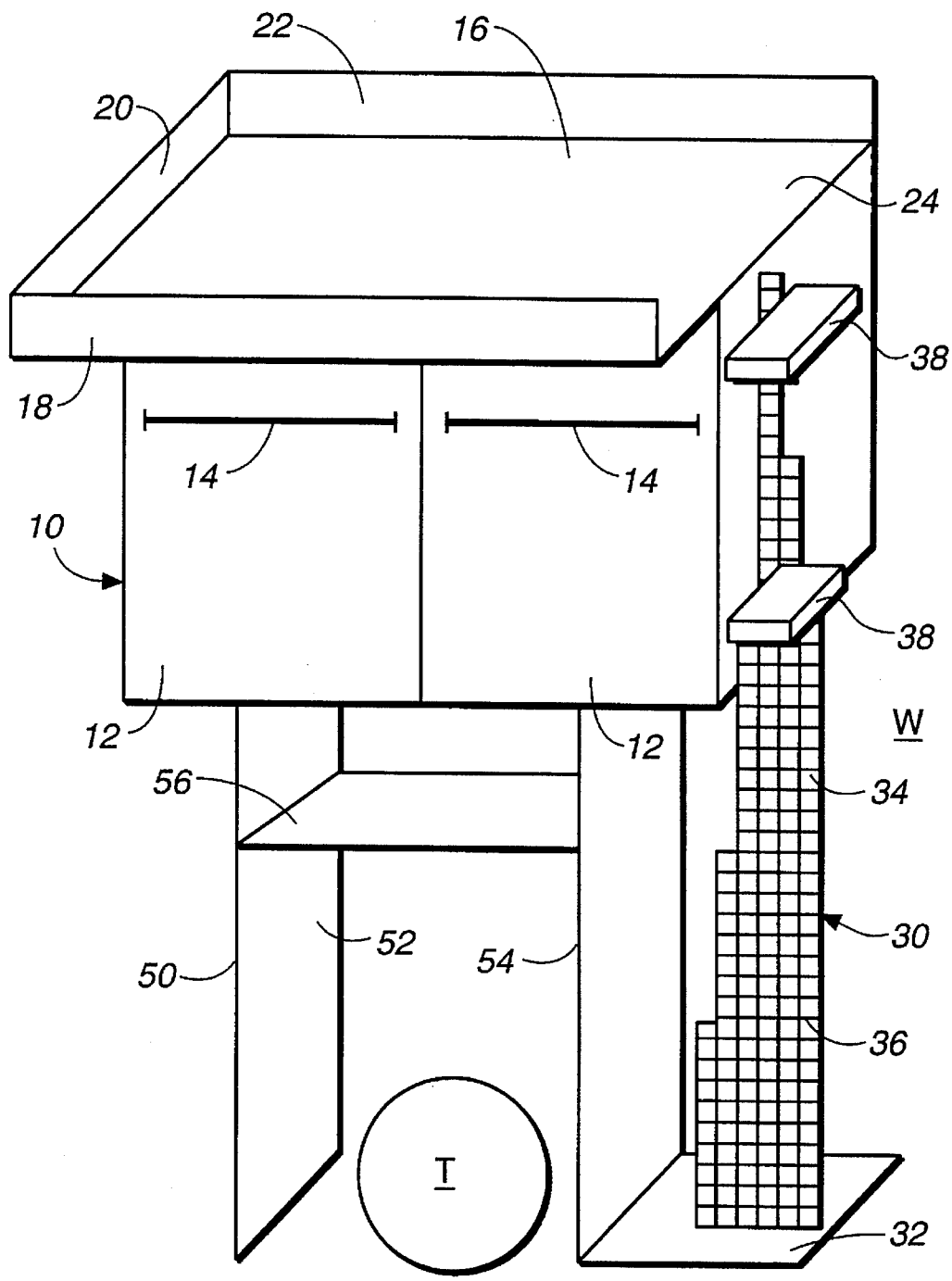
FIG._1

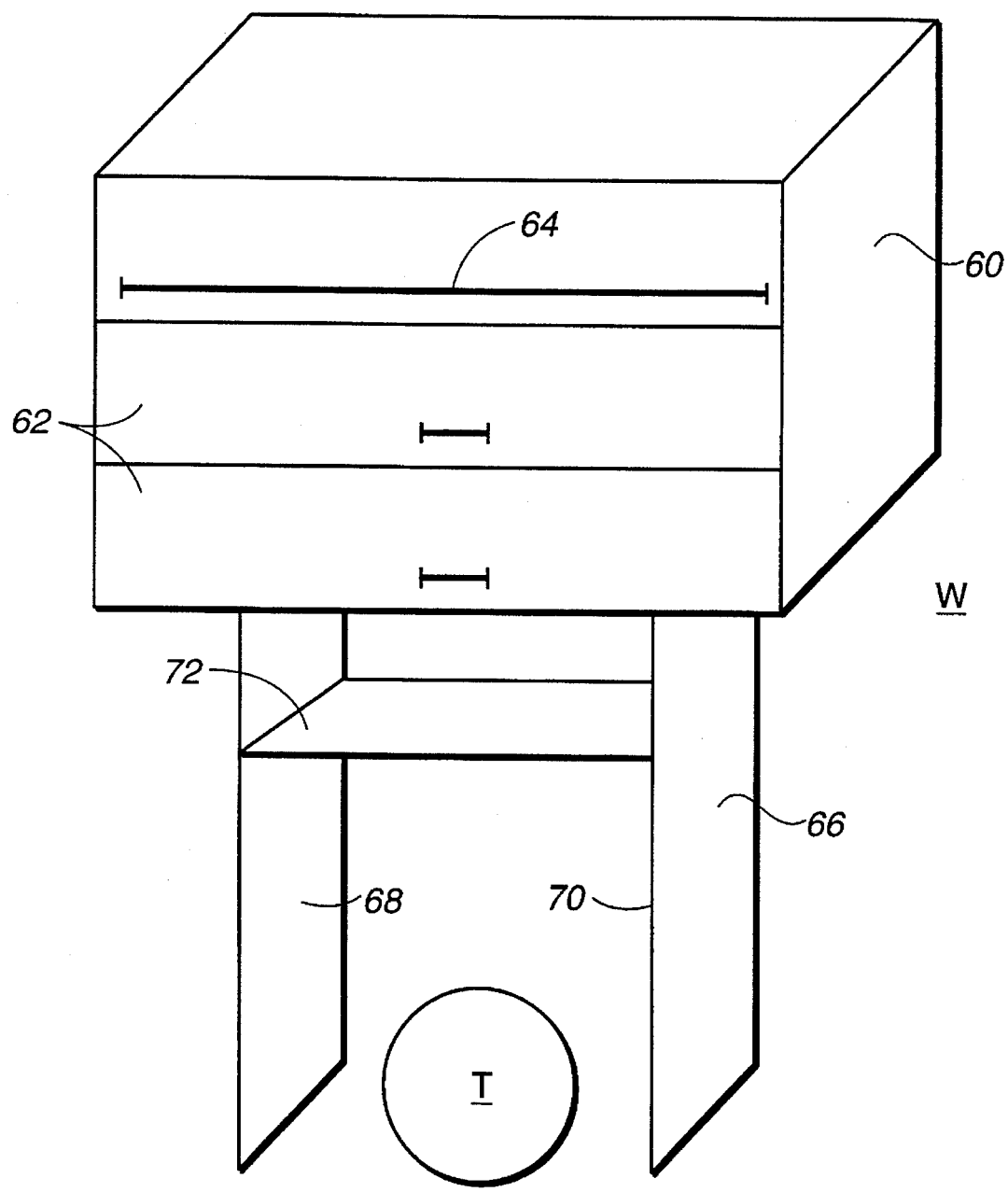
FIG._2

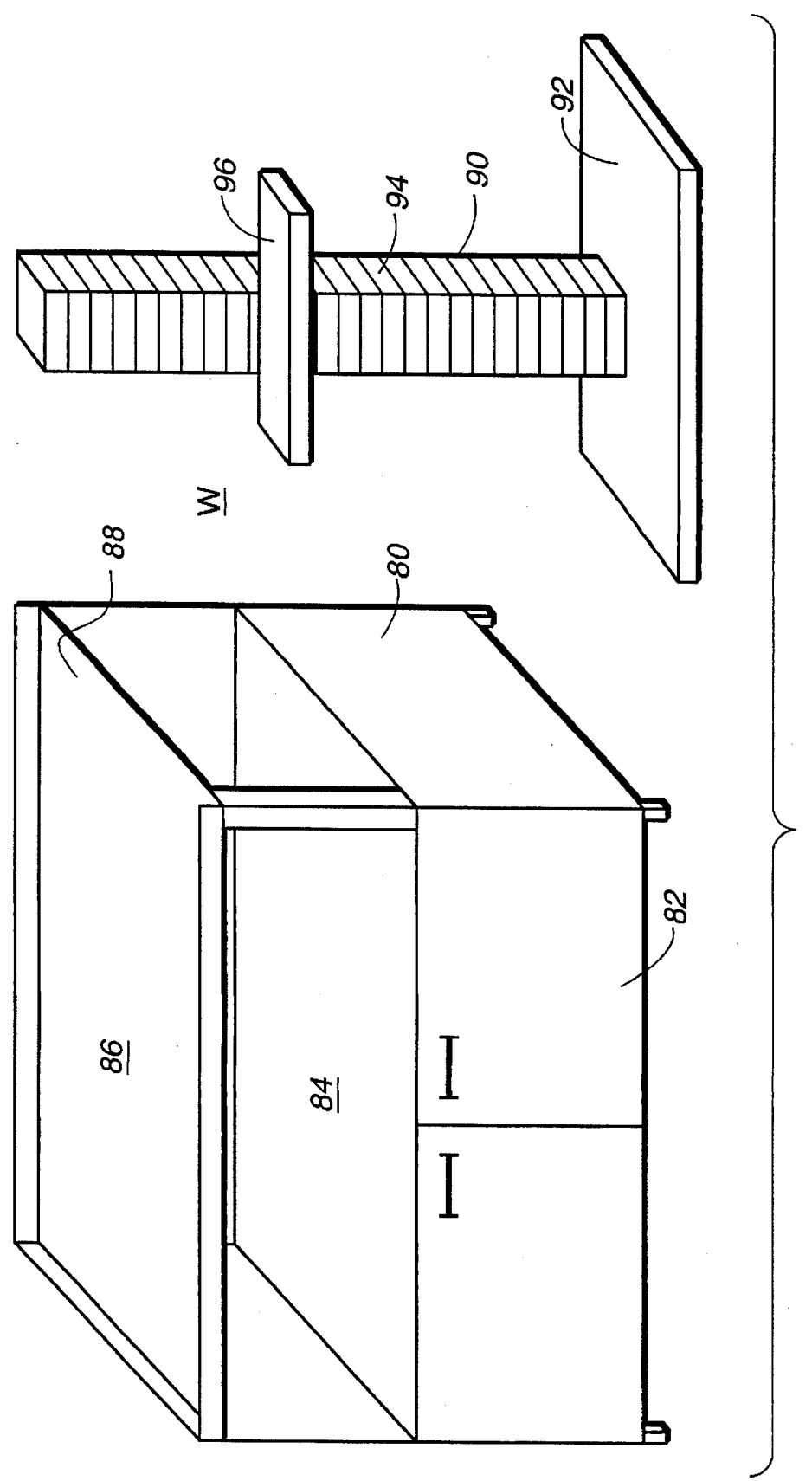
FIG._3

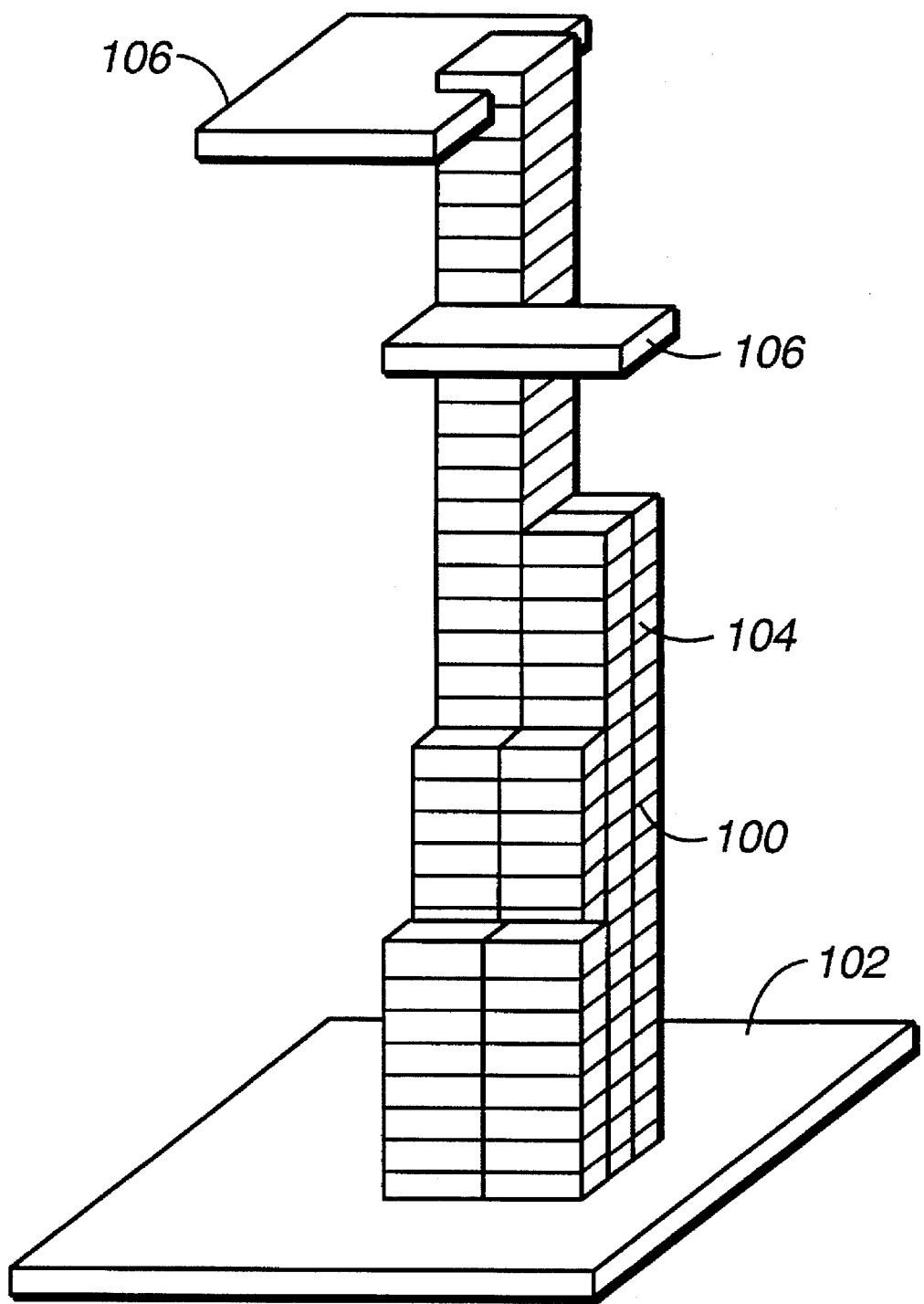
FIG._4

ELEVATED CABINET APPARATUS FOR CAT OWNER

BACKGROUND OF THE INVENTION

1. Field of the Invention

This invention relates generally to cabinets and associated furniture, and more specifically to an improved elevated cabinet apparatus for use by cat owners.

2. Description of the Prior Art

There have been numerous furniture designs developed for use by cat owners. Known designs have failed to address the important considerations of limited space.

SUMMARY OF THE INVENTION

The elevated cabinet apparatus for cat owner of this invention provides a storage cabinet secured to the wall by at least one bracket, the storage cabinet having at least one door on its front side, and preferably bearing at least one towel bar. The cabinet has a top surface carrying a carpeted shelf for support of a cat box. The cat box shelf preferably has a hinged front wall for cat box removal, a fixed side and back wall, and one open side for cat access. An associated climbing tree has a base supporting a plurality of joined vertical poles wrapped with sisal rope, the poles supporting at least one climbing platform, with the poles secured to the wall by at least one bracket. The apparatus may include a cabinet support stand having a pair of sides on opposite sides of a toilet fixture, the support stand having at least one shelf between the sides and above the toilet fixture.

For pet lovers living in cities or other urban environments, there are several problems that are solved by the present invention:

1. A cat's natural wish to climb trees even if there are none about. The climbing tree also takes care of this exercise and the shelves provide perches for the cat. Staying inside to climb also reduces the risks of cats running around the neighborhood to find a suitable climbing tree and possibly getting run over in the process. For female cats, staying inside reduces the risk of unwanted pregnancies.
2. A cat's natural urge to scratch. This does not have to be on the furniture. Cats love the sisal rope wrapped around the climbing tree.
3. Fleas. When a cat is allowed outside so that it can take care of climbing and scratching needs, it picks up an abundance of fleas. Cats have a reduced interest in going outside to play when they can do it in their own safe house. Then the owners don't have to deal with more fleas.
4. Cat-box. Where do you put this? Many rental situations have only 500 to 1,000 square feet of living space on average. Usually the bathroom has a fan or some sort of ventilation but there is very little room and it gets tiring to have to step over the cat-box every time you get in and out of the shower. By having the box elevated it is out of the way and closer to the fan. In addition, the high cat box forces the cat to climb or claw its way up the climbing tree in order to go to the bathroom. After doing this several times a day, the cat is much less likely to want to attack the furniture.
5. Children can be a real hazard for cats. The shelves on the climbing tree provide a nice safe haven for the cat to run to in case of pursuit or abundant affection. The advantages to cats of having the cat box elevated are two-fold; the cat does not have to have a young audience while going to the bathroom, and what it does in the box is way up out of the child's reach, and stays in the box (that is until the adult cleans it out).
6. Lack of storage - the lack of practical storage space is a problem in small dwellings with many of the storage units currently in retail stores being show pieces, not practical, enclosed, neat, storage areas. The inventive cabinet can be used to store a variety of items such as bathroom linens, which reduces the demand on other storage areas making access to other items easier and less frustrating.
7. Towel Bar(s). There is always a lack of towel bars as well in small places. The inventive apparatus gives an additional one. In addition, the towel bar(s) can serve as a substitute for a doorknob, thereby obviating the need for both.

Thus, the often "dead space" above the toilet has been replaced with a practical and sensible solution to some of the problems pet owners and people living in small spaces in the cities face. However, these cabinets are not restricted in use to the bathroom. They can be used in laundry/utility rooms, bedrooms, garages or anywhere in the house where they can be attached to studs. The plain cabinets were designed to match the basic designs of the other cabinets for the customers who like to have everything coordinated in their homes.

BRIEF DESCRIPTION OF THE DRAWINGS

FIG. 1 perspective view of one embodiment of an elevated cabinet apparatus for cat owner of this invention, illustrating the component parts of this embodiment including a storage cabinet secured to the wall by at least one bracket (not illustrated), the storage cabinet having a plurality of doors on its front side, the doors bearing at least one towel bar, the cabinet having a top surface carrying a carpeted shelf for support of a cat box (not illustrated), the cat box shelf having a hinged front wall or door for cat box removal, a fixed side and back wall, and one open side for cat access; a climbing tree having a base supporting a plurality of joined vertical poles wrapped with sisal rope, the poles supporting at least one climbing platform, with the poles secured to the wall by at least one bracket (not illustrated); and a cabinet support stand having a pair of sides on opposite sides of a toilet fixture, the support stand having at least one shelf between the sides and above the toilet fixture;

FIG. 2 is a perspective view of an alternate embodiment of an elevated cabinet apparatus of this invention, illustrating the component parts of this embodiment including a storage cabinet secured to the wall by at least one bracket (not illustrated), the storage cabinet having a plurality of lift-up doors on its front side, the doors bearing at least one towel bar; and a cabinet support stand having a pair of sides on opposite sides of a toilet fixture, the support stand having at least one shelf between the sides and above the toilet fixture;

FIG. 3 is a perspective view of further embodiment of an elevated cabinet apparatus for cat owner of this invention, illustrating the component parts of this embodiment including a self-supporting storage cabinet, the storage cabinet having a plurality of doors on its front side, and one open shelf to accommodate cat food dishes, the cabinet having a top surface carrying a carpeted shelf for support of a cat box (not illustrated); and a climbing tree having a base supporting a plurality of joined vertical poles wrapped with sisal rope, the poles supporting at least one climbing platform, with the poles secured to the wall by at least one bracket (not illustrated); and FIG. 4 is a perspective view of an alternate embodiment of a climbing tree having a base supporting a plurality of joined vertical poles wrapped with sisal rope, the poles supporting at least one climbing platform, with the poles secured to the wall by at least one bracket (not illustrated).

DETAILED DESCRIPTION OF A PREFERRED EMBODIMENT

FIG. 1 is a perspective view of one embodiment of an elevated cabinet apparatus for cat owner of this invention, illustrating the component parts of this embodiment including a storage cabinet 10 secured to the wall W by at least one bracket (not illustrated), the storage cabinet 10 having a plurality of doors 12 on its front side, with storage shelves in the interior of the cabinet (not illustrated). The doors 10 preferably bear at least one towel bar 14. The cabinet has a top surface carrying a carpeted shelf 16 for support of a cat box (not illustrated). The cat box shelf 16 has a hinged front wall or door 18 for cat box removal, a fixed side and back wall 20, 22, and one open side 24 for cat access. A climbing tree 30 has a base 32 supporting a plurality of joined vertical poles 34 wrapped with sisal rope 36 or other suitable, scratch-tolerant material. The poles 34 support at least one climbing platform or landing 38. The poles 34 are secured to the wall W by at least one bracket (not illustrated). A cabinet support stand 50 has a pair of sides 52, 54 on opposite sides of a toilet fixture T. The support stand 50 preferably has at least one shelf 56 extending between the sides 52, 54 and above the toilet fixture T.

The support stand 50 is preferably made of wood, is approximately 43" high, and helps provide stability and makes installation easier. The cat climbing/scratching tree 30 and the opening 24 for access to the cat box shelf can be located on the left or right of the cabinet. The cat climbing tree is preferably approximately 70½" high (4" lower than top of cabinet). It has 8 poles (each a minimum of 2½"×3" size) of different lengths all wrapped together with sisal rope. The finished dimension at base of poles is 5½" wide×10" deep. The base is 7" wide×10½" deep. The climbing tree is secured to a stud in the wall by one bracket, and the base provides stability at the bottom. The climbing tree helps take care of the cat's natural climbing and scratching needs.

FIG. 2 is a perspective view of an alternate embodiment of an elevated cabinet apparatus of this invention, illustrating the component parts of this embodiment including a storage cabinet 60 secured to the wall W by at least one bracket (not illustrated). The storage cabinet 60 has a plurality of lift-up doors 62 on its front side, the doors bearing at least one towel bar 64. A cabinet support stand 66 has a pair of sides 68, 70 on opposite sides of the toilet fixture T, and has at least one shelf 72 between the sides and above the toilet fixture.

This embodiment provides an over the toilet cabinet with a towel bar. The wood stand (43" high) helps provide stability and makes installation easier. Storage shelves may be included in the cabinet—1 @ 12" high (top shelf) and 2 @ 9" (middle and lower shelf). Cabinets may of course be duplicated for extra storage.

FIG. 3 is a perspective view of further embodiment of an elevated cabinet apparatus for cat owner of this invention, illustrating the component parts of this embodiment including a self-supporting storage cabinet 80, the storage cabinet having a plurality of doors 82 on its front side, and one open shelf 84 to accommodate cat food dishes. The cabinet has a top surface 86 carrying a carpeted shelf 88 for support of a cat box (not illustrated). A climbing tree 90 has a base 92 supporting a plurality of joined vertical poles 94 wrapped with sisal rope, and supporting at least one climbing platform 96. The poles are again secured to the wall W by at least one bracket (not illustrated).

This embodiment provides a cart structure. The top shelf is covered with carpeting for the cat box to sit on. The open middle shelf is designed so that the cat food dishes can be placed on it and the cat can sit on the shelf to eat. The bottom cabinet area provides storage. The base and shelf of the climbing tree can be covered with carpet to prevent slipping. The perch shelf also acts as a step to aid the cat in getting to top shelf of cabinet where cat box is. This design is recommended for elderly people with cats, and may rest on the floor in any room of the house.

FIG. 4 is a perspective view of an alternate embodiment of a climbing tree 100 having a base 102 supporting a plurality of joined vertical poles 104 wrapped with sisal rope. The poles support at least one climbing platform 106, with the poles secured to the wall by at least one bracket (not illustrated).

The base and perch shelves are preferably covered with carpeting. The poles are covered with sisal rope since cats naturally love it, and will readily scratch and climb the structure without training. The structure has 8 poles, is 70½" high, and the poles are approximately 2"×3" each in size (can be up to 4"×4" in size). They are secured to a stud in the wall by one sturdy bracket (3"×3") at 48" pole height. The base provides stability at the bottom. The base size is either 7" wide ×10½" deep or 10" wide ×14" deep, depending on which cabinet it accompanies. Cabinets with stands on them require a narrower tree base in order to fit into standard bathrooms.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An elevated cabinet apparatus for cat owner, said cabinet apparatus comprising:

a storage cabinet adapted to be secured to a building wall by at least one bracket, said storage cabinet having at least one door on its front side, said cabinet having a top surface;

a cat box shelf for support of a cat box attached to said cabinet top surface, said cat box shelf having a hinged front wall or door for cat box removal, a fixed side and back wall, and one open side for cat access;

a climbing tree positioned adjacent said storage cabinet and having a base supporting a plurality of joined vertical poles, said poles supporting at least one climbing platform, with said poles adapted to be secured to a building wall by at least one bracket; and a cabinet support stand connected to said storage cabinet and having a pair of sides adapted for placement on opposite sides of a toilet fixture.

2. The elevated cabinet apparatus of claim 1 wherein said support stand includes at least one shelf between said pair of sides and above the toilet fixture.

3. The elevated cabinet apparatus of claim 1 wherein said storage cabinet door includes at least one towel rack adapted for use as a doorknob.

* * * * *